Patented May 28, 1935

2,002,797

UNITED STATES PATENT OFFICE 2,002,797

ALKALI METAL COMPOUND RECOVERY FROM WASTE ORGANIC MIXTURES

Gustave T. Reich, Philadelphia, Pa.

No Drawing. Application October 21, 1932, Serial No. 638,993

9 Claims. (Cl. 23—49)

This invention relates to a process for the separation from each other of inorganic substances and organic non-sugars occurring in waste organic liquids such as fermentation liquids or liquors from sugar refineries.

An object of my invention is to provide a process by which all potash salts in such waste liquids are converted into a more readily separable and economically more valuable form, such as the nitrate or phosphate. Another object is to provide a process in which the inorganic salt content of the organic substances can be reduced. Another object is the recovery of organic non-sugars in a purer form. Another object is to liberate hydrochloric acid with another mineral acid without destroying the organic non-sugars. Another object is the raising of the nitrogen content of the organic substances.

The fermentation liquid resulting from the fermentation of cane or beet molasses may contain approximately 10% alcohol and approximately 10% of various organic substances depending on the original material. In my Patents No. 1,552,732 and No. 1,599,185, I have described a treatment of such fermentation liquids resulting in the recovery of the alcohol and of a concentrated solution of the other organic substances and in the liberation of hydrochloric acid by means of another mineral acid. These patents further describe a treatment of this solution comprising neutralization, retorting and removing organic acids, resulting in an ultimate product containing about 3.5% $N_2$ and 12–16% potassium (calculated as $K_2O$) in the form of KCl or $K_2SO_4$. This product represents a valuable fertilizer.

My invention is capable of being carried out in many different ways of which the following procedure is an illustration:

Principally my process consists of a double decomposition between the potash compounds and another inorganic salt added to the solution and so selected as to permit a separation of all inorganic salts from the organic non-sugars. The bulk of the inorganic salts may be precipitated by concentration of the solution. The supernatant solution containing the organic and the remainder of the inorganic substances may be separated from the precipitates. By availing myself of the difference in the solubility of the salts and organic non-sugars in different solvents after the double decomposition, I am able to separate them from each other and to recover them in highly pure state and greater value than originally present in the material. It is an essential feature of this invention to select the inorganic salt to be added expediently so as to produce a precipitate composed of salts of distinctly different solubility in different solvents and of considerably different solubility from each other and a liquor composed mainly of organic non-sugars.

I have discovered that ammonium nitrate and ammonium phosphate are particularly suitable for effecting the desired conversion of potash salts into more readily separable form, and that by the use of either of these salts I am enabled to effect a very complete separation of the inorganic and organic constituents of the waste liquors and to recover the separated constituents in a form of enhanced economic value.

To illustrate the practical operation of my process I shall describe the procedure when $NH_4NO_3$ is selected as the salt to be added.

The solution of organic residues remaining after the distillation of the alcohol may be neutralized according to my Patent No. 1,599,185, and need be neither retorted nor freed from the organic acids.

First, the solution is concentrated to such a specific gravity that when ammonium nitrate is added, potassium nitrate will be partly precipitated. If the solution be properly concentrated prior to the addition of ammonium nitrate, I will now be able by the mere addition of an amount of these ammonium salts preferably somewhat exceeding the stoichiometrically required quantity to precipitate 25–45% of potassium nitrate formed in pure state. Having separated the solution and precipitate by conventional means, I further concentrate the solution until a specific gravity of 1.2–1.45 is attained. When this concentration is reached the solution may be cooled, whereby practically all the inorganic salts will be precipitated and organic non-sugars will remain in solution. The bulk of the small portion of inorganic salts remaining in solution will be ammonium salt. The mother liquor is separated from the precipitate by conventional means and may be further treated according to my cited patents. The precipitate consisting of $KNO_3$ and $NH_4Cl$, together with any $K_2SO_4$ originally present, may be leached with a solvent, preferably alcohol of approximately .9–.94 specific gravity, whereby $NH_4Cl$ is dissolved completely, whereas the bulk of the potash salts remains undissolved. I separate the solution and the residue by conventional means and proceed to distill the solution, first driving off and recovering the solvent and then concentrating the aqueous solution until approximately 9/10 of its content of ammonium salt is precipitated. I separate the solution from the precipitate, returning the former to another portion of fermentation residue to be treated, thus avoiding any loss. The precipitate consists of very pure NH₄Cl.

As the result of the whole operation I obtain the bulk of the potash in the form of KNO₃, together with any K₂SO₄ originally present, and recover the chlorine in form of ammonium chloride of a high purity. I also recover the organic substances of the waste liquors in a form containing 6-8% nitrogen and free of chlorine.

By using ammonium phosphate instead of ammonium nitrate in the above example, the potash salts are obtained in the form of potassium phosphate, the other products being substantially the same as described above.

While I have described in the foregoing my invention by way of example, I wish it to be understood that I do not mean to restrict the scope of my invention to the specified conditions. The invention comprises many modifications and variations. For example, instead of directly concentrating the solution remaining after the separation of the primarily precipitated potassium nitrate as described above, I may add sufficient alcohol or other suitable organic solvent to precipitate the remainder of the potash salts, which may then be separated from the alcoholic liquor containing NH₄Cl and organic substances. It is now possible to separate the NH₄Cl from the organic substances, as I have found that the ammonium chloride is much less soluble in the concentrated aqueous solution of the organic substances than in the solvent-containing solutions, so that by distilling off the solvent, whereby the latter is recovered for reuse, the ammonium chloride separates in a pure form on cooling the residual aqueous liquor, leaving a concentrated solution of the organic substances which may be worked up into useful form, for example, by evaporation. Whether potassium salt precipitates directly upon addition of ammonium salt to the solution of residues, or only after also concentrating the solution or adding organic solvent, or both, depends upon the composition and concentration of the solution of residues.

Other modifications of the process of the invention are often advantageous, as for example, the use of other organic water soluble solvents, such as acetone and isopropyl alcohol, in place of ethyl alcohol, application of the process after retorting the original residues or before their neutralization, or application of the process to other waste organic mixtures, or by treating the double decomposition product either before or after retorting with a mineral acid, capable of liberating hydrochloric acid, or treating the retorted product with an ammonium salt and afterward with the mineral acid.

This application contains subject matter in common with my Patent Number 1,886,045, issued November 1, 1932, on application Serial No. 180,341, filed Apr. 1, 1927.

I claim:

1. Process for separating the valuable constituents of waste organic mixtures containing potassium compounds including potassium chloride, such as fermentation residues, which comprises adding to an aqueous solution of such mixtures an ammonium salt of the group consisting of ammonium nitrate and ammonium phosphate, whereby the corresponding potassium salt and ammonium chloride are produced by double decomposition, concentrating the mixture until the bulk of the inorganic salts is precipitated, and separating the potassium salt from the ammonium chloride by selective dissolution in a volatile aliphatic water-soluble solvent in which the potassium salt is substantially more insoluble than the ammonium chloride.

2. Process for separating the valuable constituents of waste organic mixtures containing potassium compounds including potassium chloride, such as fermentation residues, which comprises adding to an aqueous solution of such mixtures an ammonium salt of the group consisting of ammonium nitrate and ammonium phosphate, whereby the corresponding potassium salt and ammonium chloride are produced by double decomposition, concentrating the mixture until the bulk of the inorganic salts is precipitated, and separating the potassium salt from the ammonium chloride by selective dissolution in ethyl alcohol.

3. Process for separating the valuable constituents of waste organic mixtures containing potassium compounds, such as fermentation residues, which comprises adding to an aqueous solution of such mixtures an ammonium salt of the group consisting of ammonium nitrate and ammonium phosphate, concentrating the solution until the bulk of the inorganic salts is precipitated, separating the potassium and ammonium salts thereby precipitated, and separating the potassium salts from the ammonium salts by selective dissolution in a volatile aliphatic water-soluble solvent in which the potassium salts are substantially more insoluble than the ammonium salts.

4. Process for separating the valuable constituents of waste organic mixtures containing potassium compounds, such as fermentation residues, which comprises adding to an aqueous solution of such mixtures an ammonium salt of the group consisting of ammonium nitrate and ammonium phosphate, concentrating the solution until the bulk of the inorganic salts is precipitated, separating the potassium and ammonium salts thereby precipitated, and separating the potassium salts from the ammonium salts by selective dissolution in ethyl alcohol.

5. Process for separating the valuable constituents of waste organic mixtures containing potassium compounds, such as fermentation residues, which comprises adding to an aqueous solution of such mixtures an ammonium salt of the group consisting of ammonium nitrate and ammonium phosphate, precipitating the corresponding potassium salt therefrom by adding a volatile aliphatic water-soluble solvent in which the potassium salts are substantially more insoluble than the ammonium salts and separating the precipitated potassium salt.

6. Process for separating the valuable constituents of waste organic mixtures containing potassium compounds, such as fermentation residues, which comprises adding to an aqueous solution of such mixtures an ammonium salt of the group consisting of ammonium nitrate and ammonium phosphate, precipitating the corresponding potassium salt therefrom by adding ethyl alcohol, and separating the precipitated potassium salt.

7. Process for separating the valuable constituents of waste organic mixtures containing potassium compounds, such as fermentation residues, which comprises adding to an aqueous solution of such mixtures an ammonium salt or the group consisting of ammonium nitrate and ammonium phosphate, precipitating the corresponding potassium salt therefrom, by adding a volatile aliphatic water-soluble solvent in which the potassium salts are substantially more insoluble than the ammonium salts, separating the precipitated potassium salt, distilling off the organic solvent, and separating the ammonium salt thereby precipitated.

8. Process for separating the valuable constituents of waste organic mixtures containing potassium compounds including potassium chloride, such as fermentation residues, which comprises adding to an aqueous solution of such mixtures an ammonium salt of the group consisting of ammonium nitrate and ammonium phosphate, whereby the corresponding potassium salt and ammonium chloride are produced by double decomposition, separating the potassium salt from the ammonium chloride by selective dissolution in a volatile aliphatic water-soluble solvent in which the potassium salt is substantially more insoluble than the ammonium chloride, and separating the ammonium chloride from the organic substances associated therewith by distilling off the organic solvent and removing the ammonium chloride thereby precipitated.

9. Process for separating the valuable constituents of waste organic mixtures containing potassium compounds including potassium chloride, such as fermentation residues, which comprises adding to an aqueous solution of such mixtures an ammonium salt of the group consisting of ammonium nitrate and ammonium phosphate, whereby the corresponding potassium salt and ammonium chloride are produced by double decomposition, separating the potassium salt from the ammonium chloride by selective dissolution in ethyl alcohol and separating the ammonium chloride from the organic substances associated therewith by distilling off the ethyl alcohol and removing the ammonium chloride thereby precipitated.

GUSTAVE T. REICH.